(12) United States Patent
Simon

(10) Patent No.: US 6,840,280 B1
(45) Date of Patent: Jan. 11, 2005

(54) FLOW THROUGH ULTRASONIC PROCESSING SYSTEM

(75) Inventor: William P. Simon, New Milford, CT (US)

(73) Assignee: Sonics & Materials Inc., Newtown, CT (US)

( * ) Notice: Subject to any disclaimer, the term of this patent is extended or adjusted under 35 U.S.C. 154(b) by 70 days.

(21) Appl. No.: 10/426,194

(22) Filed: Apr. 30, 2003

Related U.S. Application Data

(60) Provisional application No. 60/399,627, filed on Jul. 30, 2002.

(51) Int. Cl.[7] ................................................ F15C 1/04
(52) U.S. Cl. .................... 137/828; 137/814; 137/833; 137/842; 137/315.07; 137/315.41; 137/328; 137/340; 251/368; 239/102.2
(58) Field of Search ............................... 137/828, 842, 137/340, 833, 807, 814, 315.07, 315.41, 328; 251/368; 239/102.2

(56) References Cited

U.S. PATENT DOCUMENTS

| | | | |
|---|---|---|---|
| 3,144,037 A | 8/1964 | Gargill et al. ............. 137/81.5 |
| RE26,605 E | 6/1969 | Gargill et al. ............. 137/81.5 |
| 3,534,754 A | * 10/1970 | Beeken ........................ 137/815 |
| 3,715,104 A | 2/1973 | Cottell ........................... 259/1 |
| 3,825,481 A | 7/1974 | Supitilov .................... 204/193 |
| 4,019,683 A | 4/1977 | Asai et al. ................... 239/102 |
| 4,121,620 A | * 10/1978 | Pickett et al. ............... 137/828 |
| 4,144,752 A | 3/1979 | Lolk ............................. 73/194 |
| 4,301,968 A | 11/1981 | Berger et al. ............... 239/102 |
| 4,352,459 A | 10/1982 | Berger et al. ............... 239/102 |
| 4,352,570 A | 10/1982 | Firth .......................... 366/127 |
| 5,040,560 A | * 8/1991 | Glezer et al. ................. 137/13 |
| 5,111,847 A | * 5/1992 | Hu et al. ..................... 137/828 |
| 5,330,100 A | 7/1994 | Malinowski ............. 239/102.2 |
| 5,395,592 A | 3/1995 | Bolleman et al. ........... 422/128 |
| 5,516,043 A | 5/1996 | Manna et al. ............ 239/102.2 |
| 5,662,136 A | * 9/1997 | Drzewiecki et al. .......... 137/14 |
| 5,803,106 A | * 9/1998 | Cohen et al. ................. 137/13 |
| 6,244,738 B1 | 6/2001 | Yasuda et al. .............. 366/114 |

* cited by examiner

*Primary Examiner*—A. Michael Chambers
(74) *Attorney, Agent, or Firm*—St. Onge Steward Johnston & Reens LLC

(57) ABSTRACT

These and other objects of the present invention are achieved by provision of a flow through ultrasonic system for facilitating the flow of flow-resistant materials. The system includes a supply of material and an ultrasonic horn having at least one passage extending therethrough. An isolating tube which is compatible with the material is provided passing through the at least one passage in the ultrasonic horn, the isolating tube in communication the supply of material and completely isolating the ultrasonic horn from the material. A converter imparts ultrasonic energy to the ultrasonic horn, and in turn to the isolating tube so as to inhibit the material from attaching to and clogging the isolating tube.

25 Claims, 8 Drawing Sheets

FLOW THROUGH ULTRASONIC PROCESSING SYSTEM

RELATED APPLICATIONS

This patent application claims the benefit of, under Title 35, United States Code, Section 119(e), U.S. Provisional Patent Application No. 60/399,627, filed Jul. 30, 2002.

FIELD OF THE INVENTION

The present invention relates generally to a flow through ultrasonic system, and more particularly to such a system which advantageously facilitates the flow of materials which typically may stick to and/or dog conduits through which they flow (i.e., flow resistant materials).

BACKGROUND OF THE INVENTION

The treatment of various liquids by ultrasonic energy is well known. Ultrasonic energy has proven to be an effective means for homogenizing, dispersing, blending, mixing and reducing particles in one or more liquids, as well as for expediting certain chemical reactions. It is also well known that horn resinators can be employed to concentrate ultrasonic energy. U.S. Pat. Nos. 3,715,104 and 3,825,481 employ horn resonators to couple ultrasonic energy to the treated fluid which may comprise foods, medicaments, cosmetics and the like.

FIG. 1 illustrates an example of a conventional flow cell 110 employing a traditional horn 112, which flow cell 110 includes a housing 114 which defines a processing chamber 116. Housing 114 also includes an inlet 118 and an outlet 120 through which a liquid to be treated is passed (indicated by arrows). The end of horn 112 is immersed in the liquid within processing chamber 116 and horn 112 is ultrasonically vibrated to process the liquid.

More specifically, an ultrasonic power supply (not shown) converts typical AC electricity to high frequency electrical energy. This electrical energy is transmitted to a piezoelectric transducer with in a converter 122, where it is changed to mechanical vibrations in the ultrasonic range. The ultrasonic vibrations are intensified by horn 112 and focused at the tip. The ultrasonic activity of horn 112 imparts the vibration energy to the liquid within processing chamber 116 thereby accomplishing the desired result therein. As these processes are well known, more detail is not provided herein.

However, while such a flow cell 110 may provide adequate for homogenizing, dispersing, blending, mixing, reducing particles in and expediting certain chemical reactions in the liquid within processing chamber 116, flow cell 110 does little or nothing to aid in facilitating the flow of materials which typically may stick to and/or clog conduits through which they flow before and after the material is within the processing chamber 116. As such, the material may still stick to and/or clog the conduits leading to and from inlet 118 and outlet 120.

Attempts have been made to design an ultrasonic vibrator specifically configured to aid in facilitating the flow of certain materials. For example, U.S. Pat. No. 5,929,552 is directed to such a device for transporting a small flow rate of powder. The device includes an ultrasonic horn 7A having a hole passing therethrough. Attached at either end of this hole are metallic pipes 14, 15 one of which 14 has attached to it a resilient supply tube 16 which is in turn connected to a supply 1 of the powder to be flowed. A lower end of the horn 7A is rotationally vibrated in an elliptical orbit, the elliptical orbit having an elongated diameter extending in a lateral direction, such that powder passing through the hole and contacting the horn is promoted to flow substantially tangent to the elliptical orbit.

U.S. Pat. No. 5,929,552, however, suffers from a number of disadvantages. Because the patent is concerned with facilitating the flow of powders in a specific way, it is required that the powder actually come in contact with the horn 7A. However, the material which to is be flowed may be chemically incompatible with materials (i.e., typically metals) of which horns are typically made. As such, it would be impossible to employ the device disclosed in U.S. Pat. No. 5,929,552, which specifically requires contact with the horn 7A, in connection with such materials. Moreover, the way in which the device is designed relies on gravity to feed the powder from the supply 1 to the horn 7A, and does nothing to facilitate the flow of the powder from the supply to the horn—because of the precise rotational vibration in an elliptical orbit, flow is only facilitated in the immediate vicinity of the area in which the powder contacts the horn 7A. As such, when materials which typically may stick to and/or dog conduits through which they flow are being used, the material may stick to and/or dog metallic pipe 14 and/or resilient supply tube 16.

FIG. 2 illustrates another attempt to design an ultrasonic vibrator 210 specifically configured to aid in facilitating the flow of certain materials, employing the concept of water coupled ultrasonics. This approach is used when the ultrasonic horn 212 cannot be allowed to touch the materials flowing (indicated by arrows) within a flow tube 214 due to chemical or other incompatibility. Ultrasonic vibrator 210 includes a housing 216 which defines a jacket 218 surrounding flow tube 214 and ultrasonic horn 212, which jacket is filled with water. Ultrasonic energy created by a converter 220 (as discussed more fully above) is transmitted through the water within jacket 218 to flow tube 214 and then to the material to be processed. Water seals 222 are required around flow tube 214 and at the node area of ultrasonic horn 212. Cooling ports 224 and some type of water cooling and/or supply system (not shown) are also required in order to exchange the water within jacket 218, as the water may become excessively heated depending upon the level of ultrasonics required for the application.

This design, however, also suffers from a number of disadvantages. First, because of the indirect nature of the transmission of the ultrasonic energy (i.e., through the water), in order for enough energy to reach the flow tube 214, a high level of ultrasonic energy must be supplied by converter 220. This is an inefficient process, as a great deal of energy may be lost to heating the water. Another disadvantage is the complex (and therefore expensive) nature of the design. As discussed above, ultrasonic vibrator 210 requires water seals 222 at various locations, which seals 222 will have to be replaced from time to time, as well as cooling ports 224 and some type of water cooling and/or supply system (not shown) which are also required in order to exchange the water with in jacket 218. These required elements may greatly increase the initial cost of manufacture as well as the ongoing operational expenses. A further disadvantage is that leaks may develop, thereby allowing the water within jacket 218 to leak, potentially causing damage to converter 220 or other portions of the ultrasonic generation system, as well as other components in connection with which ultrasonic vibrator 210 may be used. Still another disadvantage is that because horn 212 is in direct contact with the water within jacket 218, cavitation may occur when horn 212 is ultrasonically vibrated, which may lead to cavitation erosion of horn 212.

What is desired, therefore, is a flow through ultrasonic system which facilitates the flow of materials which typically may stick to and/or clog conduits through which they flow, which may be used with substantially any type of materials, including those which are chemically or otherwise incompatible with the material of which the horn is formed, which does not require that the material being flowed come in contact with the horn, which is relatively electrically efficient, which is relatively simple in design, which is relatively inexpensive to manufacture and operate, which is not prone to developing potentially damaging leaks, and which is not prone to damage to the horn caused by cavitation erosion.

SUMMARY OF THE INVENTION

Accordingly, it is an object of the present invention to provide a flow through ultrasonic system which facilitates the flow of materials which typically may stick to and/or dog conduits through which they flow.

Another object of the present invention is to provide a flow through ultrasonic system having the above characteristics and which may be used with substantially any type of materials, including those which are chemically or otherwise incompatible with the material of which the horn is formed.

A further object of the present invention is to provide a flow through ultrasonic system having the above characteristics and which does not require that the material being flowed come in contact with the horn.

Still another object of the present invention is to provide a flow through ultrasonic system having the above characteristics and which is relatively electrically efficient.

Yet a further object of the present invention is to provide a flow through ultrasonic system having the above characteristics and which is relatively simple in design.

Yet another object of the present invention is to provide a flow through ultrasonic system having the above characteristics and which is relatively inexpensive to manufacture and operate.

Still yet a further object of the present invention is to provide a flow through ultrasonic system having the above characteristics and which is not prone to developing potentially damaging leaks.

Still yet another object of the present invention is to provide a flow through ultrasonic system having the above characteristics and which is not prone to damage to the horn caused by cavitation erosion.

These and other objects of the present invention are achieved by provision of a flow through ultrasonic system for facilitating the flow of flow-resistant materials. The system includes a supply of material and an ultrasonic horn having at least one passage extending therethrough. An isolating tube is provided passing through the at least one passage in the ultrasonic horn, the isolating tube in communication the supply of material and completely isolating the ultrasonic horn from the material. A converter imparts ultrasonic energy to the ultrasonic horn, and in turn to the isolating tube so as to inhibit the material from attaching to and dogging the isolating tube.

Preferably, the isolating tube and the at least one passage through the ultrasonic horn are sized and shaped such that at least a portion of the at least one passage through the ultrasonic horn tightly frictionally engages at least a portion of the isolating tube. In certain embodiments, the at least one passage through the ultrasonic horn has a generally constant cross-section, and wherein the isolating tube and the at least one passage through the ultrasonic horn are sized and shaped such that the at least one passage through the ultrasonic horn tightly frictionally engages at least a portion of the isolating tube along substantially the entire length of the at least one passage.

In other embodiments, the at least one passage through the ultrasonic horn comprises at least one first portion sized and shaped such that the at least one first portion tightly frictionally engages a portion of the isolating tube, and at least one second portion sized and shaped such that the at least one second portion does not contact a portion of the isolating tube passing through the at least one second portion. In certain of these embodiments, the at least one first portion of the at least one passage through the ultrasonic horn is positioned in an area of maximum vibrational amplitude of the ultrasonic horn. In some of these embodiments, the at least one first portion of the at least one passage through the ultrasonic horn comprises two first portions, and wherein each of the two first portions are positioned in areas of maximum vibrational amplitude of the ultrasonic horn. In certain of these embodiments, the two first portions of the at least one passage through the ultrasonic horn are positioned adjacent external edges of the ultrasonic horn.

The isolating tube is formed from a material so as to be compatible with the material flowing through the isolating tube. Preferably, the isolating tube is formed from a generally flexible material. In certain embodiments, the isolating tube is formed from polytetrafluoroethylene.

In some embodiments, the at least one passage through the ultrasonic horn is substantially parallel to the direction in which ultrasonic energy is introduced. In other embodiments, the at least one passage through the ultrasonic horn is substantially perpendicular to the direction in which ultrasonic energy is introduced. In still other embodiments, the at least one passage through the ultrasonic horn includes a portion which is substantially parallel to the direction in which ultrasonic energy is introduced and a portion which is substantially perpendicular to the direction in which ultrasonic energy is introduced.

A dispensing nozzle in communication with an end of the isolating tube opposite an end of the isolating tube in communication with the supply of material may be provided. In certain of these embodiments, the dispensing nozzle is positioned such that vibrations introduced into the isolating tube reach the dispensing nozzle. In some embodiments, the supply of material is positioned such that vibrations introduced into the isolating tube reach the supply of material.

In some embodiments, the ultrasonic horn further comprises a mechanism for facilitating insertion of the isolating tube in the at least one passage. In certain of these embodiments, the mechanism for facilitating insertion of the isolating tube in the at least one passage comprises a slot formed in the ultrasonic horn between the passage and an edge of the ultrasonic horn adjacent the passage in order to create first and second separate walls, the first wall having a threaded hole formed therein, and a threaded jack screw or bolt sized to cooperatively engage the threaded hole. The threaded jack screw or bolt is insertable into the threaded hole in the first wall and rotatable in a first direction until an end thereof contacts the second wall. Continued rotation of the jack screw or bolt in the first direction causes a force to be exerted causing the first and second walls to separate, so as to cause an increase in the size of the passage in order to allow the isolating tube to be more easily inserted into the passage. The jack screw or bolt is rotatable in a second direction so as to remove the force causing the first and second walls to separate, so as to cause the passage to return to its original dimensions and tightly engage the isolating tube therein. In certain embodiments, continued rotation in the second direction causes the jack screw or bolt to exit the hole in the first wall.

In another respect, the present invention is directed to an ultrasonic horn assembly for use in a flow through ultrasonic system for facilitating the flow of flow-resistant materials. The ultrasonic horn assembly comprises an ultrasonic horn having at least one passage extending therethrough, a slot formed in the ultrasonic horn between the passage and an edge of the ultrasonic horn adjacent the passage in order to create first and second separate walls, the first wall having a threaded hole formed therein, and a threaded jack screw or bolt sized to cooperatively engage the threaded hole. The threaded jack screw or bolt is insertable into the threaded hole in the first wall and rotatable in a first direction until an end thereof contacts the second wall, wherein continued rotation of the jack screw or bolt in the first direction causes a force to be exerted causing the first and second walls to separate, so as to cause an increase in the size of the passage. The jack screw or bolt is rotatable in a second direction so as to remove the force causing the first and second walls to separate, so as to cause the passage to return to its original dimensions.

In some embodiments, continued rotation in the second direction causes the jack screw or bolt to exit the hole in the first wall. In some embodiments, the at least one passage through the ultrasonic horn has a generally constant cross-section. In other embodiments, the at least one passage through the ultrasonic horn comprises at least one first portion having a first cross-sectional diameter and at least one second portion having a second cross-sectional diameter greater that the first cross-sectional diameter. In certain of these embodiments, the at least one first portion of the at least one passage through the ultrasonic horn is positioned in an area of maximum vibrational amplitude of the ultrasonic horn. In some embodiments, the at least one first portion of the at least one passage through the ultrasonic horn comprises two first portions, and wherein each of the two first portions are positioned in areas of maximum vibrational amplitude of the ultrasonic horn. In certain of these embodiments, the two first portions of the at least one passage through the ultrasonic horn are positioned adjacent external edges of the ultrasonic horn.

The invention and its particular features and advantages will become more apparent from the following detailed description considered with reference to the accompanying drawings.

DETAILED DESCRIPTION OF AN EMBODIMENT OF THE INVENTION

Figure 1:
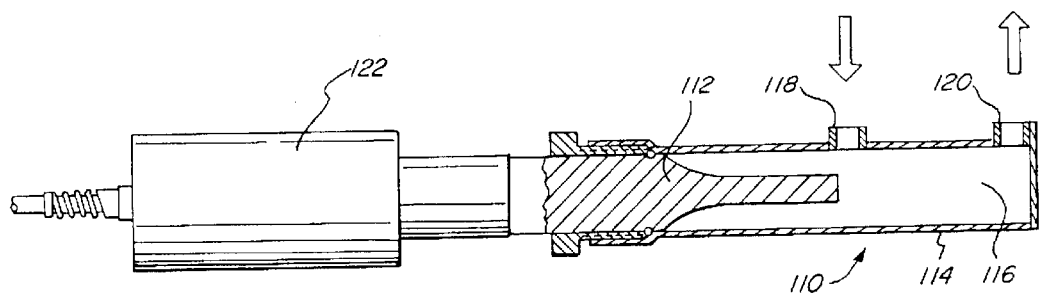
FIG. 1 is a partially cross-sectional view of a known flow cell having a conventional horn.
Figure 2:
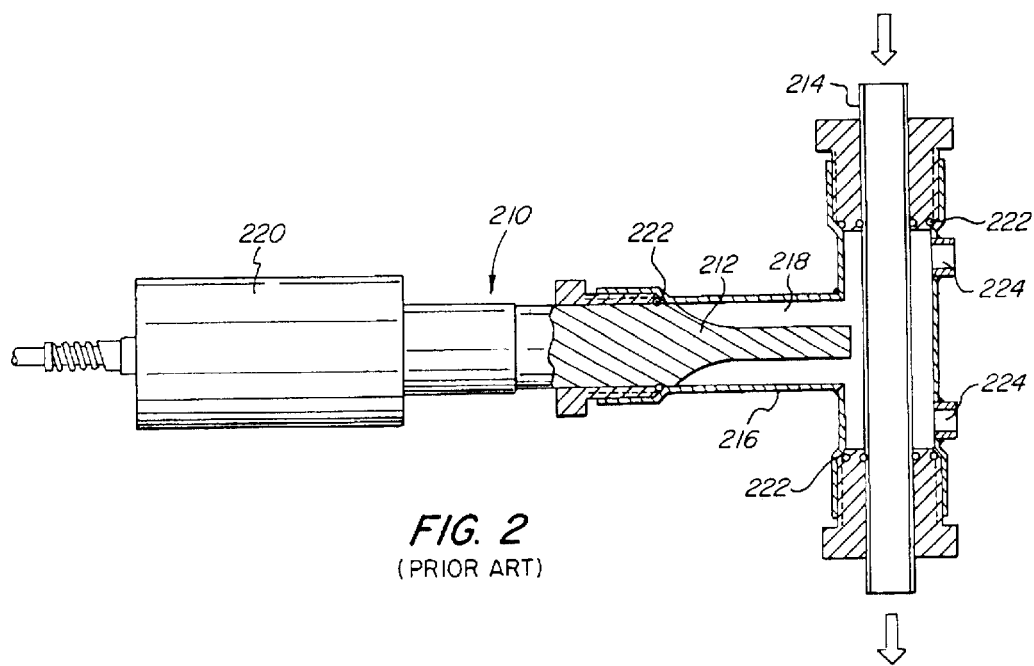
FIG. 2 is a partially cross-sectional view of a known flow cell employing the concept of water coupled ultrasonics.
Figure 3:
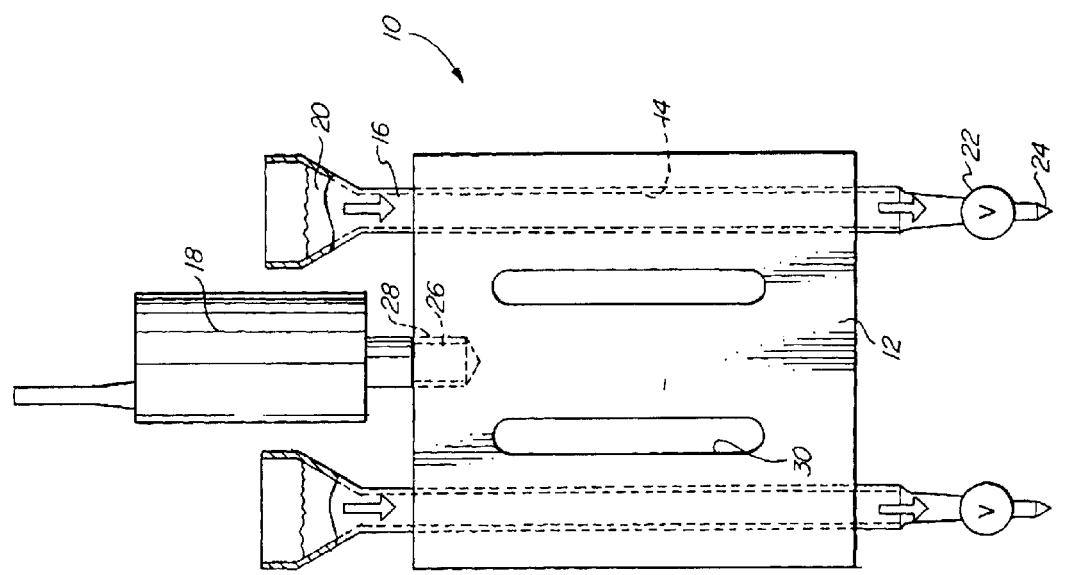
FIG. 3 is an elevational front view, partially in phantom, of a flow through ultrasonic system in accordance with an embodiment of the present invention.

Referring now to FIG. 3, a flow through ultrasonic system 10 in accordance with the present invention is shown. System 10 is generally comprised of an ultrasonic horn 12 having at least one passage 14 extending completely therethrough, an isolation tube 16 passing through each passage 14, a converter 18 for vibrating ultrasonic horn 12, and a supply 20 of material in communication with each tube 16. System 10 is particularly adapted for use with materials which typically may stick to and/or clog conduits through which they flow (i.e., flow resistant materials). Attached to tube 16 opposite its end in communication with supply 20 of material may be provided a valve 22 or the like and/or a dispensing nozzle 24 or the like depending upon that particular material in question and its intended use. It should be understood that although FIG. 3 shows two passages 14 extending through ultrasonic horn 12, two isolating tubes 16 passing through passages 14, and two supplies 20 of material, system 10 could easily be adapted to have a fewer or greater number of each of these elements.

As discussed above, an ultrasonic power supply (not shown) converts typical AC electricity to high frequency electrical energy. This electrical energy is transmitted to a piezoelectric transducer within converter 18, where it is changed to mechanical vibrations in the ultrasonic range. The ultrasonic vibrations are intensified by ultrasonic horn 12 which is connected to converter 18 in such a way that the mechanical vibrations generated by converter 18 are transferred to ultrasonic horn 12. As these processes are well known, more detail is not provided herein. It is worth noting, however, that amplitude levels below those generally considered adequate to process liquid reactions may be employed here, as the present invention is generally concerned with facilitating flow, and not with processing liquid reactions.

Ultrasonic horn 12 may have any of a number of configurations as is known in the art, with a relatively simple bar horn configuration being shown in the Figures for the sake of clarity. Ultrasonic horn 12 includes some type of mechanism for allowing it to be attached to converter 18. For example, ultrasonic horn may include an opening 26 in one of its surfaces having female threads adapted to engage male threads provided on protrusion 28 extending from converter 18. Ultrasonic horn may also have one or more openings 30 passing therethrough to optimize its ultrasonic properties for the particular application in connection with which system 10 is to be used, as is known to those skilled in the art.

Tubes 16 are formed from a generally flexible material, the specific material being selected based upon the material to be flowed, such that the material to be flowed will be chemically and otherwise compatible with (i.e., will not corrode or otherwise undesirably react with) the material of tubes 16. It is also desirable that the material from which tubes 16 are made have a high melting temperature, as some amount of energy will be absorbed by tubes 16, thereby causing heating thereof to some degree. Generally, the higher the melting temperature of the tube material, the higher the amplitude that can be used. It has been found that for many materials to be flowed, forming the tubes 16 of polytetrafluoroethylene (i.e., Teflon@) provides acceptable results from both material compatibility and heat resistance standpoints.

The inner diameter of each of openings 14 and the outer diameter of tubes 16 are sized such that at least a portion of openings 14 tightly frictionally engages a corresponding portion of tubes 16, as will be more fully described below. This tight frictional engagement causes the ultrasonic energy of ultrasonic horn 12 to be imparted on tubes 16, without generating significant frictional heat, as would be generated if ultrasonic horn 12 and tubes 16 were only in light contact, thereby allowing relative movement (and therefore frictional heat generation) between the two. Dense, "sticky," or otherwise flow-resistant materials thereby flow more easily through tubes 16 because the ultrasonic energy imparted to tubes 16 provides a moving interface between the inside of tubes 16 and the material flowing therethrough, thereby inhibits the material from sticking to the tube wall. The material flows more freely that it otherwise would have without ultrasonics applied.

Preferably, supply of material 20 on one side of ultrasonic horn 12 and any valves 22 or the like and/or dispensing nozzles 24 or the like on the other side of ultrasonic horn 12 are positioned so as to minimize the lengths of the portions of tubes 16 outside of ultrasonic horn 12, so as to minimize the portions of tube 16 not subject to ultrasonic vibrations. However, it should be noted that due to the tight frictional engagement between ultrasonic horn 12 and tubes 16, and the resulting vibrations imparted on tubes 16 by ultrasonic horn 12, vibrations will travel at least to some degree along tubes 16 away from its engagement with ultrasonic horn 12, the specific extent of the travel of such vibrations being dictated by the precise configuration of tubes 16 and the specific materials from which tubes 16 are made. Thus, it is possible to have substantially no part of tubes 16, from supply 20 of material to any valves 22 or the like and/or a dispensing nozzles 24 or the like, which is not subject to vibrations to some degree and thereby which would be more prone to clogging.

Passages 14 through ultrasonic horn 12 are formed all the way through a portion of ultrasonic horn 12, although it is not necessary that passages comprise straight cylindrical passages, as more fully described below in connection with FIGS. 4–11. It should be noted that although the inclusion of passages 14 does change the amplitude and tuning frequency of horn 12, these changes are easily compensated for using computational tools available in the art today.

Figure 4:
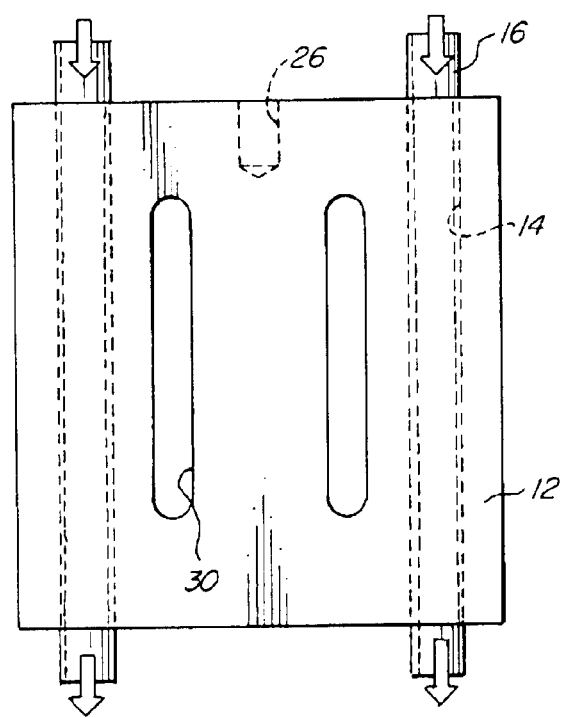
FIG. 4 is an elevational front view, partially in phantom, of a first embodiment of a portion of the flow through ultrasonic system of FIG. 3.
Figure 5:
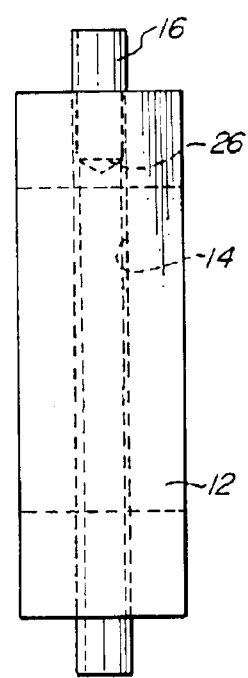
FIG. 5 is an elevational side view, partially in phantom, of the portion of the flow through ultrasonic system shown in FIG. 4.

Referring now to FIGS. 4 and 5, a first embodiment of ultrasonic horn 12 is shown in more detail. Ultrasonic horn 12 is adapted for connection with converter 18 from above in a generally vertical configuration, and includes two passages 14 having generally constant cross-sections along the entire lengths thereof in which are received two tubes 16 in tight engagement along substantially an entire length of passages 14. Material is flowed through tubes 16 under gravitational forces in the directions indicated by the arrows in FIG. 4.

Figure 6B:
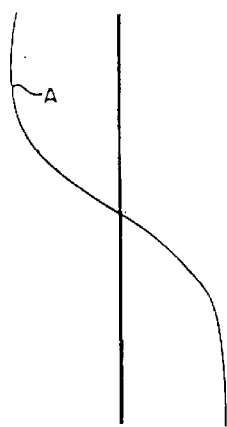
FIG. 6B is graphical representation of ultrasonic energy versus position along the portion of the flow through ultrasonic system shown in FIG. 6A.
Figure 6A:
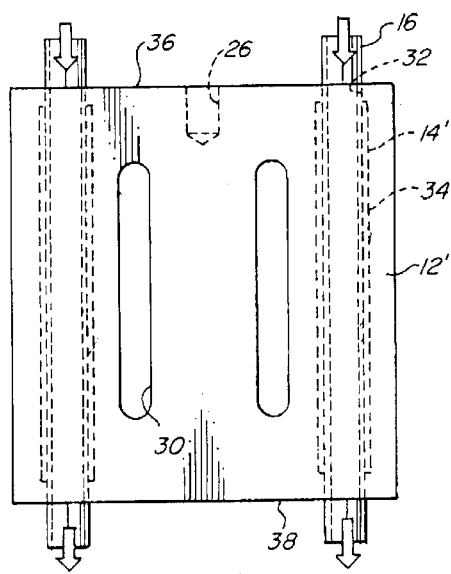
FIG. 6A is an elevational front view, partially in phantom, of a second embodiment of a portion of the flow through ultrasonic system of FIG. 3.
Figure 7:
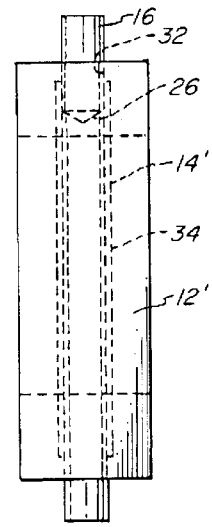
FIG. 7 is an elevational side view, partially in phantom, of the portion of the flow through ultrasonic system shown in FIG. 6A.

Referring now to FIGS. 6A, 6B and 7, a second embodiment of ultrasonic horn 12' is shown in more detail. Ultrasonic horn 12' is adapted for connection with converter 18 from above in a generally vertical configuration, and includes two passages 14' in which are received two tubes 16. However, rather than passages 14' having generally constant cross-sections along the entire lengths thereof, each of passages 14' includes two engaging portions 32 having inner diameters sized to tightly engage tubes 16 and a non-engaging portion 34 having an inner diameter sized so as not to contact tubes 16. Engaging portions 32 are preferably positioned at the uppermost 36 and lowermost 38 edges of ultrasonic horn 12', which correspond to the areas of maximum vibrational amplitude (plotted as A in FIG. 6B). Material is flowed through tubes 16 under gravitational forces in the directions indicated by the arrows in FIG. 6A.

Figure 8B:
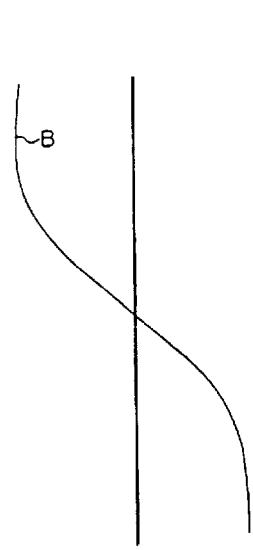
FIG. 8B is graphical representation of ultrasonic energy versus position along the portion of the flow through ultrasonic system shown in FIG. 8A.
Figure 8A:
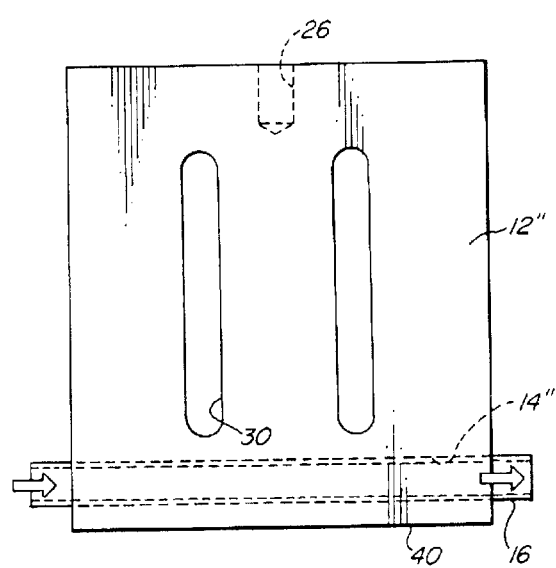
FIG. 8A is an elevational front view, partially in phantom, of a third embodiment of a portion of the flow through ultrasonic system of FIG. 3.
Figure 9:
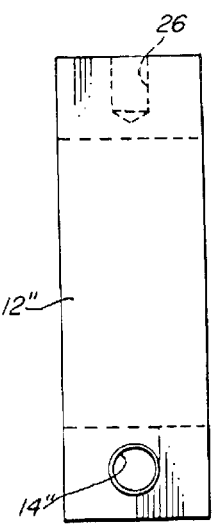
FIG. 9 is an elevational side view, partially in phantom, of the portion of the flow through ultrasonic system shown in FIG. 8A.

Referring now FIGS. 8A, 8B and 9, a third embodiment of ultrasonic horn 12" is shown in more detail. Ultrasonic horn 12" is adapted for connection with converter 18 from a side in a generally horizontal configuration, and includes one passage 14" having a generally constant cross-section along the entire length thereof in which is received tube 16 in tight engagement along substantially an entire length of passage 14". Passage 14" is preferably positioned in an area of ultrasonic horn 12" which is subjected to a maximum vibrational amplitude (plotted as B in FIG. 8B), which for the configuration of ultrasonic horn 12" shown in FIGS. 8A and 9 would be adjacent an edge 40 thereof opposite to opening 26 for attachment to converter 18. Material is flowed through tube 16 under gravitational forces in the directions indicated by the arrows in FIG. 8A.

Figures 10A, 10B, 11:
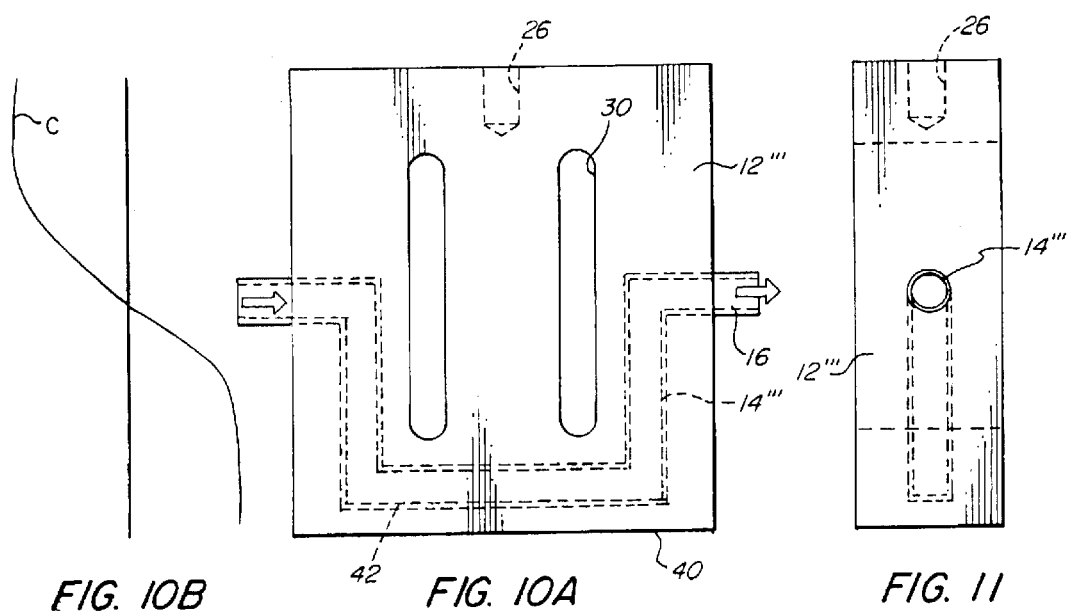
FIG. 10A is an elevational front view, partially in phantom, of a fourth embodiment of a portion of the flow through ultrasonic system of FIG. 3.
FIG. 10B is graphical representation of ultrasonic energy versus position along the portion of the flow through ultrasonic system shown in FIG. 10A.
FIG. 11 is an elevational side view, partially in phantom, of the portion of the flow through ultrasonic system shown in FIG. 10A.

Referring now FIGS. 10A, 10B and 11, a fourth embodiment of ultrasonic horn 12''' is shown in more detail. Ultrasonic horn 12''' is adapted for connection with converter 18 from a side in a generally horizontal configuration, and is similar to the embodiment shown in FIGS. 8A, 8B and 9, with the exception that rather than passage 14''' passing straight through ultrasonic horn 12''', passage 14''' is configured such that tube 16 enters and exits ultrasonic horn 12''' in the area of an ultrasonic node (see vibrational amplitude plotted as C in FIG. 10B), while still including a portion 42 adjacent edge 40 so as to be subject to maximum vibrational amplitude in this area. This embodiment may be desirable, for example, if for some reason the user found it undesirable to have vibrations travel along tube 16 away from its engagement with ultrasonic horn 12'''.

Figure 12:
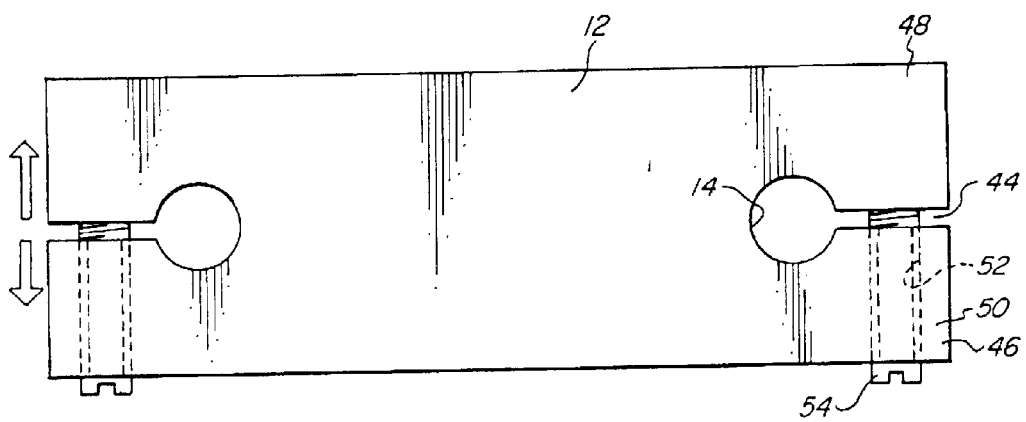
FIG. 12 is a top plan view, partially in phantom, of an additional feature of the flow through ultrasonic system of FIG. 3, shown specifically in connection with the embodiment of the portion of the flow through ultrasonic system shown in FIG. 4, but which may also be employed with the embodiments of the portion of the flow through ultrasonic system shown in FIG. 6A, FIG. 8A and FIG. 10A.

Referring now to FIG. 12, an additional feature of system 10 is shown. Because it is desirable to achieve a very tight frictional engagement between tubes 16 and corresponding passages 14, it may be difficult to force tubes 16 into passages 14 without some mechanism for facilitating insertion. Such a mechanism is shown in FIG. 12. A slot 44 is formed in ultrasonic horn 12 between passage 14 and an edge 46 of ultrasonic horn 12 adjacent thereto in order to create two separate walls 48, 50. In one of the walls 50 is formed a hole 52 having female threads. A corresponding male threaded jack screw or bolt 54 is inserted into hole 52 until an end thereof contacts the other of walls 48, which does not include a hole. At this point, continued turning of jack screw or bolt 54 exerts a force (indicated by arrows in FIG. 12) causing walls 48, 50 to separate slightly, thereby also causing a slight increase in the size of passage 14. Tube 16 may then be more easily inserted into passage, and the jack screw or bolt 54 unscrewed so as to remove the force separating walls 48, 50, so as to cause passage 14 to return to its original dimensions and tightly engage tube 16 therein. Jack screw or bolt 54 may be left in hole 52, or if desirable (e.g., for proper ultrasonic operation), may be removed completely. It should be understood that although the above jack screw or bolt mechanism is shown in FIG. 12 specifically in connection with the embodiment shown in FIG. 4, it may be easily adapted for use with the embodiments shown in FIG. 6A, FIG. 8A and FIG. 10A.

The present invention, therefore, provides a flow through ultrasonic system which facilitates the flow of materials which typically may stick to and/or dog conduits through which they flow, which may be used with substantially any type of materials, including those which are chemically or otherwise incompatible with the material of which the horn is formed, which does not require that the material being flowed come in contact with the horn, which is relatively electrically efficient, which is relatively simple in design, which is relatively inexpensive to manufacture and operate, which is not prone to developing potentially damaging leaks, and which is not prone to damage to the horn caused by cavitation erosion.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A flow through ultrasonic system for facilitating the flow of flow-resistant materials:
   a supply of material;
   an ultrasonic horn having at least one passage extending therethrough;
   an isolating tube passing through the at least one passage in said ultrasonic horn, said isolating tube in communication said supply of material and completely isolating said ultrasonic horn from the material, said isolating tube being compatible with the material; and
   a converter imparting ultrasonic energy to said ultrasonic horn, and in turn to said isolating tube so as to inhibit the material from attaching to and clogging said isolating tube.

2. The flow through ultrasonic system of claim 1 wherein said isolating tube and the at least one passage through said ultrasonic horn are sized and shaped such that at least a portion of the at least one passage through said ultrasonic horn tightly frictionally engages at least a portion of said Isolating tube.

3. The flow through ultrasonic system of claim 2 wherein the at least one passage through said ultrasonic horn has a generally constant cross-section, and wherein said isolating tube and the at least one passage through said ultrasonic horn are sized and shaped such that the at least one passage through said ultrasonic horn tightly frictionally engages at least a portion of said isolating tube along substantially the entire length of the at least one passage.

4. The flow through ultrasonic system of claim 2 wherein the at least one passage through said ultrasonic horn comprises:
   at least one first portion sized and shaped such that the at least one first portion tightly frictionally engages a portion of said isolating tube; and
   at least one second portion sized and shaped such that the at least one second portion does not contact a portion of said isolating tube passing through the at least one second portion.

5. The flow through ultrasonic system of claim 4 wherein the at least one first portion of the at least one passage through said ultrasonic horn is positioned in an area of maximum vibrational amplitude of said ultrasonic horn.

6. The flow through ultrasonic system of claim 3 wherein the at least one first portion of the at least one passage through said ultrasonic horn comprises two first portions, and wherein each of the two first portions are positioned in areas of maximum vibrational amplitude of said ultrasonic horn.

7. The flow through ultrasonic system of claim 6 wherein the two first portions of the at least one passage through said ultrasonic horn are positioned adjacent external edges of said ultrasonic horn.

8. The flow through ultrasonic system of claim 1 wherein said isolating tube is formed from a generally flexible material.

9. The flow through ultrasonic system of claim 1 wherein said isolating tube is formed from polytetrafluoroethylene.

10. The flow through ultrasonic system of claim 1 wherein the at least one passage through said ultrasonic horn is substantially parallel to the direction in which ultrasonic energy is introduced.

11. The flow through ultrasonic system of claim 1 wherein the at least one passage through said ultrasonic horn is substantially perpendicular to the direction in which ultrasonic energy is introduced.

12. The flow through ultrasonic system of claim 1 wherein the at least one passage through said ultrasonic horn includes a portion which is substantially parallel to the direction in which ultrasonic energy is introduced and a portion which is substantially perpendicular to the direction in which ultrasonic energy is introduced.

13. The flow through ultrasonic system of claim 1 further comprising a dispensing nozzle in communication with an end of said isolating tube opposite an end of said isolating tube in communication with said supply of material.

14. The flow through ultrasonic system of claim 13 wherein said dispensing nozzle is positioned such that vibrations introduced into said isolating tube reach said dispensing nozzle.

15. The flow through ultrasonic system of claim 1 wherein said supply of material is positioned such that vibrations introduced into said isolating tube reach said supply of material.

16. The flow through ultrasonic system of claim 1 wherein said ultrasonic horn further comprises a mechanism for facilitating insertion of said isolating tube in the at least one passage.

17. The flow through ultrasonic system of claim 16 wherein said mechanism for facilitating insertion of said isolating tube in the at least one passage comprises:
   a slot formed in said ultrasonic horn between the passage and an edge of said ultrasonic horn adjacent the passage in order to create first and second separate walls, the first wall having a threaded hole formed therein;

a threaded jack screw or bolt sized to cooperatively engage the threaded hole;

wherein said threaded jack screw or bolt is insertable into the threaded hole in the first wall and rotatable in a first direction until an end thereof contacts the second wall, wherein continued rotation of said jack screw or bolt in the first direction causes a force to be exerted causing the first and second walls to separate, so as to cause an increase in the size of the passage in order to allow said isolating tube to be more easily inserted into the passage; and wherein said jack screw or bolt is rotatable in a second direction so as to remove the force causing the first and second walls to separate, so as to cause the passage to return to its original dimensions and tightly engage said isolating tube therein.

18. The flow through ultrasonic system of claim 17 wherein continued rotation in the second direction causes said jack screw or bolt to exit the hole in the first wall.

19. An ultrasonic horn assembly for use in a flow through ultrasonic system for facilitating the flow of flow-resistant materials, said ultrasonic horn assembly comprising:

an ultrasonic horn having at least one passage extending therethrough;

a slot formed in said ultrasonic horn between the passage and an edge of said ultrasonic horn adjacent the passage in order to create first and second separate walls, the first wall having a threaded hole formed therein;

a threaded jack screw or bolt sized to cooperatively engage the threaded hole;

wherein said threaded jack screw or bolt is insertable into the threaded hole in the first wall and rotatable in a first direction until an end thereof contacts the second wall, wherein continued rotation of said jack screw or bolt in the first direction causes a force to be exerted causing the first and second walls to separate, so as to cause an increase in the size of the passage; and wherein said jack screw or bolt is rotatable in a second direction so as to remove the force causing the first and second walls to separate, so as to cause the passage to return to its original dimensions.

20. The ultrasonic horn assembly of claim 19 wherein continued rotation in the second direction causes said jack screw or bolt to exit the hole in the first wall.

21. The ultrasonic horn assembly of claim 19 wherein the at least one passage through said ultrasonic horn has a generally constant cross-section.

22. The ultrasonic horn assembly of claim 19 wherein the at least one passage through said ultrasonic horn comprises at least one first portion having a first cross-sectional diameter and at least one second portion having a second cross-sectional diameter greater that the first cross-sectional diameter.

23. The ultrasonic horn assembly of claim 22 wherein the at least one first portion of the at least one passage through said ultrasonic horn is positioned in an area of maximum vibrational amplitude of said ultrasonic horn.

24. The ultrasonic horn assembly of claim 22 wherein the at least one first portion of the at least one passage through said ultrasonic horn comprises two first portions, and wherein each of the two first portions are positioned in areas of maximum vibrational amplitude of said ultrasonic horn.

25. The ultrasonic horn assembly of claim 24 wherein the two first portions of the at least one passage through said ultrasonic horn are positioned adjacent external edges of said ultrasonic horn.

* * * * *